United States Patent Office 3,304,323
Patented Feb. 14, 1967

3,304,323
OXYGENATED DICYCLOALKYL SULFONES
Gunther S. Fonken, Charleston Township, Kalamazoo County, Milton E. Herr, Kalamazoo Township, Kalamazoo County, and Herbert C. Murray, Barry Township, Barry County, Mich., assignors to The Upjohn Company, Kalamazoo, Mich., a corporation of Delaware
No Drawing. Filed Mar. 20, 1964, Ser. No. 353,567
13 Claims. (Cl. 260—488)

This invention relates to a novel method for introduction of oxygen into dicycloalkylsulfones and to the novel products thus produced. More particularly, this invention relates to the introduction of oxygen into a cycloalkyl ring of a dicycloalkylsulfone by subjecting said dicycloalkylsulfone to the oxygenating activity of microorganisms of Subphylum 2 of Phylum III, hereinafter identified, to the novel oxygenated dicycloalkylsulfones thus produced and to derivatives thereof.

The novel process and products of this invention are represented by the following reaction scheme:

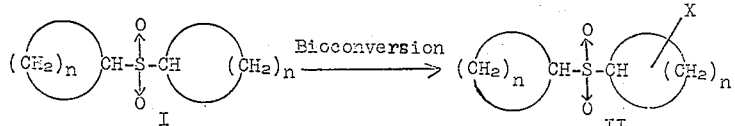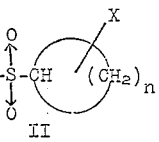

wherein each $n$ is a whole number from 4 to 14, inclusive; and X is selected from the group consisting of hydroxy and keto.

The novel compounds of this invention include those represented by Formula II, above; the acylates of the compounds of Formula II, wherein X is hydroxy and the acyl radical is that of a hydrocarbon carboxylic acid containing from 1 to 12 carbon atoms, inclusive; and the functional derivatives of the compounds of Formula II, wherein X is keto, such as the oximes, hydrazones, semicarbazones, thiosemicarbazones and cyclic alkylene ketals thereof, in which the alkylene radical contains from 2 to 8 carbon atoms, inclusive.

The novel compounds of this invention are useful as intermediates, insecticides, fungicides, parasiticides, protein denaturants, insect repellants, high boiling solvents, plasticizers for synthetic resins, as cross-linking agents, pharmacologic agents for psychic control effects and as intermediates for dyes, polymers and fibers.

As an example of their use as intermediates the compounds represented by the Formula II, wherein X is keto (the hydroxy compounds can be converted to ketones as hereinafter described) can be converted to lactams which can be hydrolyzed to amino acids in accordance with the procedures disclosed in U.S. Patents 2,579,851 and 2,569,114. For example, the ketones are converted to oximes by reacting them with hydroxylamine or a salt thereof. The oximes are then subjected to a Beckman rearrangement by treatment with sulfuric acid or the equivalent to produce lactams. The lactams thus produced are useful intermediates giving on hydrolysis amino acids. The lactams and amino acids thus obtained are useful for the manufacture of valuable products, for example, polyamides, as disclosed in 2,579,851 supra.

The microbiological process of this invention comprises subjecting a dicycloalkyl sulfone (I) to the oxygenating activity of a species of Subphylum 2 of Phylum III to produce an oxygenated compound (II).

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology, Sixth Edition, 1957, Saunders Company, Philadelphia at page 10. This aforesaid Subphylum 2 of Phylum III embraces five classes, namely, Phycomycetes, Ascomycetes, Basidiomycetes, Deuteromycetes (*Fungi imperfecti*) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonadales and Actinomycetales. Among the families of the above listed orders, it is preferred to employ in the practice of this invention species of microorganisms falling within the families Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenangium, Adelopus, Chaetomium, Endothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

TABLE I

*Phycomycetes*

Entomophthorales—Conidiobolus, Delacroixia
Mucorales—Absidia, Blakeslea, Circinella, Chaetocladium, Cunninghamella, Helicostylum, Gongronella, Mucor, Parasitella, Phycomyces, Rhizoplus
Saprolegniales—Achlya

*Ascomycetes*

Endomycetales—Ascocybe, Byssochlamys, Cephaloascus, Endomyces, Endomycopsis, Petasospora
Eurotiales—Ctenomyces, Carpenteles, Eidamella, Emericillopis, Eurotium, Microascus, Penicilliopsis, Talaromyces
Dothideales—Acrospermum, Capnodium, Chaetothyrum, Cymadothea, Dangeardiella, Dothidea, Rhopographus, Scorias
Helotiales—Allophylaria, Cenangium, Corynella, Dermea, Godronia, Pezizella
Hemisphaeriales—Schizothyrina, Schizothyrium
Hypocreales—Calonectria, Calostilbe, Claviceps, Cordyceps, Creonectria, Epichloe, Gibberella, Hypocrea, Hypomyces, Loramyces, Melanospora, Nectria, Nectriella, Neocosmospora, Ophionectria, Sphaerostilbe
Hysteriales—Farlowiella, Gloniella, Gloniopsis, Glonium, Hysterium, Lophium, Mytilidion, Ostreion
Myriangiales—Dothiora, Elsinoe
Pezizales—Ascobolus, Discomycetalla, Morchella, Patella, Pyronema, Sowerbyella, Wolfina
Phacidiales—Coccopeziza, Colpoma, Clithris, Phacidiella, Phacidium, Sphaerothyrium Sphaeriales—Adelopus, Chaetomium Chaetomidium, Clathrospora, Didymella, Endothia, Glomerella, Guignardia, Mycosphaerella Physalospora, Xylaria, Subbaromyces Taphrinales—Protomyces, Taphridium Taphrina

Basidiomycetes

Agaricales—Aleurodiscus, Alnicola, Boletus, Clavaria, Coprinus, Clitocybe, Collybia, Coniophora, Corticum, Deconica, Entaloma, Fomes, Hygrophorus, Lentinellus, Lentinus, Panaeolus, Paxillus, Peniophora, Pholiota, Pleurotus, Plicatura, Polyporus, Poria, Psalliota, Schizophyllum, Sparassis, Stereum, Tricholoma, Trametes Lycoperdales—Bovista, Calvatia, Geastrum, Lycoperdon Nidulariales—Crucibulum, Cyathus, Nidula, Schaerobolus Phallales—Mutinus, Phallus, Simblum Sclerodermatales—Gastrosporium, Lycogalopsis, Phellorinia, Sphaerobolus, Tulostoma Tremellales—Auricularia, Ceratobasidium, Calocera, Dacrymyces, Helicobasidium Ustilaginales—Bryophytomyces, Cintractia, Entyloma, Farysia, Graphiola, Scchizonella, Sorosporium, Tilletia, Tolyposporium, Urocystis, Ustilago

Deuteromycetes

Melanconiales—Actinonema, Allelchaeta, Colletotrichum, Cryptosporium, Entomosporium, Melanconium, Myxosporium, Pestalotia, Septomyxa, Steganosporium, Tuberculariella Moniliales—Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Penicillium, Sepedonium, Sporotrichum, Trichothecium Mycelia Sterilia—Microxyphium, Papulospora, Rhizoctonia, Sclerotium Sphaeropsidales—Ascochyta, Coniothyrium, Dendrophoma, Diplodia, Diplodina, Polyopeus, Sphaeropsis, Wojnowicia, Zythia

Schizomycetes

Actinomycetales—Micrococcus, Mycobacterium, Mycococcus, Nocardia, Streptomyces

Pseudomonadales—Pseudomonas, Mycoplana, Protaminobacter

Eubacteriales—Aerobacter, Arthrobacter, Bacillus, Corynebacterium

Cultures of a large number of species, falling within the group of microorganisms which can be employed in the process of the invention, are available from known sources such as the Northern Utilization Research and Development Branch, U.S. Department of Agriculture, Peoria, Illinois (NRRL), the American Type Culture Collection (ATCC), Washington, D.C., and Centraalbureau voor Schimelcultures (CBS), Baarn, Holland or as otherwise indicated. The species listed in Table II, together with Culture Collection numbers, are typical of those which are available from the above sources and are representative of those which can be employed in the process of the invention.

TABLE II

Phycomycetes

Achlya americana, ATCC 10977
Achlya bisexualis, ATCC 11397
Achlya crenulata, ATCC 11315, CBS
Absidia cylindrospora, ATCC 11516
Absidia cylindrospora, NRRL 2796
Absidia cylindrospora, var, rhizamorpha, NRRL 2815
Absidia pseudocylindrospora, NRRL 2770
Absidia glauca, ATCC 7852a, 7852b
Circinella angarensis, NRRL 2410
Circinella angarensis, NRRL 2628
Circinella spinosa, ATCC 9025, CBS
Cunninghamella blakesleeana, ATCC 8688a
Cunninghamella baineri, ATCC 6794b
Gongronella bulteri, CBS
Gongronella urceolifera, CBS
Gongronella lacrispora, NRRL 2643
Mucor griseocyanus, ATCC 1207a
Rhizopus arrhizus, ATCC 11145
Rhizopus nigricans, ATCC 6227b

Ascomycetes

Adelopus nudus, CBS
Cenangium abietis, CBS
Dermea balsama, CBS
Dermea libocedri, CBS
Eurotium echinulatum, CBS
Calonectria decora, CBS
Clithris quercina, CBS
Gibberella saubinettii, CBS
Hypomyces haematococcus, CBS
Chaetomium globosum, ATCC 6205
Gloniopsis brevisaccata, CBS
Glonium clavisporum, CBS
Glonium stellatum, CBS
Hysterium angustatum, CBS
Hysterium insidens, CBS
Mytilidion australe, CBS
Mytilidion hastenii, CBS
Mytilidion tortile, CBS
Endothia parasitica, ATCC 9414
Guignardia bidwelli, ATCC 9559, 9560

Basidiomycetes

Alnicola escharoides, CBS
Boletus luteus, CBS
Boletus sp, Peck 168 (Ohio State Univ.)
Coprinus narcoticus, CBS
Corticium sasakkii, NRRL 2705
Corticium microsclerotia, NRRL 2727
Clavaria stricta, CBS
Deconica atrorufa, CBS
Deconica coprophila, CBS
Cyathus poeppigii, CBS
Cyathus olla, CBS
Pleurotus passeckerianus, ATCC 9416
Pholiota adiposa, ATCC 9393
Poria ambigua, ATCC 9408
Sphaerobolus stellatus, CBS

Deuteromycetes

Alternaria tenuis, ATCC 6663
Aspergillus nidulans, ATCC 11267
Aspergillus niger, ATCC 9027
Aspergillus niger, ATCC 9142
Aspergillus niger, ATCC 10579
Aspergillus niger, ATCC 8740
Aspergillus proliferans, CBS
Aspergillus ruber, ATCC 9481
Aspergillus versicolor, ATCC 9577
Brachysporium oryzae, ATCC 11571, CBS
Cladosporium resinae, NRRL 2778
Curvularia lunata, ATCC 12017
Curvularia pallescens, ATCC 12017, NRRL 2381
Cylindrium suaveolens, CBS
Cylindroscarpon didymum, CBS
Cylindroscarpon radicicola, ATCC 11811
Fusarium culmorum, ATCC 12656
Helicodendron tubulosum, CBS, ATCC 7808
Helicosporium lumbricopsis, CBS
Helicosporium phragmitis, CBS
Helminthosporium carbonum, ATCC 9627
Keratinomyces ajelloi, CBS
Penicillium atrovenetum, CBS
Penicillium aurantio-virens, ATCC 10413, NRRL 2138
Penicillium patulum, ATCC 9260, 10120 NRRL 994
Rhizoctonia solani, ATCC 6221, 10154, 10157, 10159, 10163

*Sepedonium ampullosporum*, CBS
*Sporotrichum sulfurescens*, ATCC 7159
*Trichothecium roseum*, ATCC 8685, NRRL 1665
*Ascochyta linicola*, NRRL 2923, CBS
*Diplodia natalensis*, ATCC 9055
*Septomyxa affinis*, ATCC 6737
*Wojnowicia graminis*, CBS
*Zythia resinae*, CBS

Schizomycetes

*Mycobacterium rhodochrous*, ATCC 999, 4273, 4276
*Micrococcus flavoroseus*, ATCC 397
*Micrococcus cerolyticus*, ATCC 12559
*Micrococcus cinnabareus*, ATCC 11890
*Micrococcus rubens*, ATCC 186
*Nocardia corallina*, CBS, ATCC 4273, 2161
*Nocardia erythropolis*, CBS, ATCC 4277
*Nocardia gardneri*, ATCC 9604
*Nocardia restrictus*, CBS
*Aerobacter aerogenes*, ATCC 8724
*Streptomyces roseochromogenus*, ATCC 3347
*Streptomyces argenteolus*, ATCC 11009
*Streptomyces olivaceus*, ATCC 12019
*Streptomyces mediocidicus*, ATCC 13279
*Streptomyces mediocidicus*, ATCC 13278
*Pseudomonas aeruginosa*, ATCC 8689
*Pseudomonas fluorescens*, ATCC 949
*Corynebacterium simplex*, ATCC 6946

The following starting materials (I) for the process of this invention are known in the art; cyclopentylsulfone, cyclohexylsulfone and cyclopentylcyclohexylsulfone. The other starting materials can be prepared in accordance with the process illustrated in Preparations 1 to 3, contained herein.

The operational condition and reaction procedures of this invention are advantageously those known in the art of bioconversion as illustrated in Murray et al. U.S. Patents 2,602,769 and 2,735,800.

In the practice of this invention, the bioconversion can be effected by a growing or resting culture of the microorganism or by spores, washed cells or enzymes of the microorganism.

Culture of the selected species of microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines, starches; meat extracts, peptones, amino acids, proteins, fatty acids, glycerol, whey and the like. These materials may be used either in a purified state or as concentrates such as whey concentrate, corn steep liquir, grain mashes, and the like, or as mixture of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range are suitable.

The substrate can be added to the culture during the growth period of the microorganism as a single feed or by gradual addition during the conversion period or it can be added to the medium before or after sterilization or inoculation, making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate when it is a solid in an organic solvent and mixing the solution thoroughly with the medium or by adding to the medium finely comminuted particles of the substrate, e.g., micronized particles, preferably 90% by weight smaller than 20 microns either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such range as supports life, active growth or the enzyme activity of the microorganism; the range of 20 to 35° C. is preferred. A pH of about 4 to 6 is generally preferred for growth of the microorganism during the bioconversion but for acid-sensitive substrates, and for microorganisms of the class Schizomycetes, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961) Reinhold Publishing Co., New York, N.Y.].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Patents 3,031,379 and 3,031,382. The separation of washed cells from the fermentation medium is well known in the art, see for example, U.S. Patent 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate, under aerobic fermentation conditions.

After completion of the fermentation, the resulting oxygenated products (II) are recovered from the fermentation beer by conventional methods. For example, the whole beer can be extracted with a water-immiscible organic solvent, e.g., methylene chloride, chloroform, carbon tetrachloride, ethylene chloride, trichloroethylene, ether, amyl acetate, benzene, and the like, or the beer and mycelia can be separated by conventional methods, e.g., centrifugation or filtration, and then separately extracted with suitable solvents. The mycelia can be extracted with either water-miscible or water-immiscible solvents, or, in cases where little or no product is contained in the mycelia, merely washed with water and the wash water added to the beer. The beer, free of mycelia, can then be extracted with water-immiscible solvents, such as those listed above. The extracts are combined, dried over a drying agent, such as anhydrous sodium sulfate, and the solvent removed by conventional methods, such as evaporation or distillation at atmospheric or reduced pressure. The oxygenated products thus obtained can be further purified by conventional methods, such as recrystallization, chromatography, distillation in the case of liquids, and the like.

Separation of the various oxygenated products (II) obtained as products of the fermentation, can be accomplished by conventional methods, e.g., chromatography and/or fractional crystallization, or, in the case of liquids, by distillation. In certain, instances when separation of the hydroxy compounds is difficult, a convenient and advantageous method is first to oxidize under acidic, neutral, or slightly basic conditions the crude oxygenated dicycloalkylsulfones in accordance with methods known in the art for oxidizing secondary hydroxy groups to ketones, for example, Fieser and Fieser, Natural Products Related to Phenanthrene, 3rd Ed., pages 127–129, 193 and 194, Reinhold Publishing Corp., New York, N.Y. Thus, the crude mixture containing oxygenated cycloalkylsulfones are dissolved in an inert organic solvent, such as acetone, benzene, methylene chloride, t-butanol, and the like, and then oxidized with aqueous chromic acid, potassium permanganate, t-butylhypochlorite and like oxidizing agents, to convert the secondary hydroxy groups present to keto, thereby producing a mixture of the corresponding keto compounds II which are then subjected to separation by chromatography and/or crystallization or distillation in the case of liquids.

The compounds of Formula II, wherein X is keto, can, if desired, be reduced, preferably under neutral or acidic conditions in accordance with methods known in the art for reducing carbonyl groups, to hydroxy compounds. For example, reduction can be conveniently accomplished with one molar equivalent or more of, for example, hydrogen in the presence of a catalyst such as palladium, platinum or Raney nickel under neutral conditions; sodium in an alkanol; or with a reducing agent such as, for example, lithium aluminum hydride, sodium borohydride, isobutyl magnesium bromide or lithium tritertiary butoxy aluminum hydride, and the like.

The compounds of Formula II, wherein X is hydroxy, can be acylated in accordance with methods known in the art for acylating secondary hydroxy groups, for example, by reaction with the appropriate acid anhydride or acid halide, by reaction with the appropriate ester or by reaction with the appropriate acid in the presence of an esterification catalyst. Suitable acylating agents are organic carboxylic acids, particularly hydrocarbon carboxylic acids containing from one to twelve carbon atoms, inclusive, or the acid anhydrides or acid halides thereof. Examples of acids employed in the formation of the acylates of the invention include saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like.

The compound of Formula II, wherein X is keto, can be converted to carbonyl derivatives such as oximes, hydrazones, semicarbazones, cyclic alkylene ketals and the like in accordance with methods known in the art. For example, the carbonyl group can be ketalized by reacting the selected compound with an alkanediol selected from the group of alkane-1,2-diols or alkane-1,3-diols containing up to and including eight carbon atoms, such as ethylene, propylene, trimethylene, 2,2-dimethyltrimethylene, 1,2-butylene, 2,4-pentylene, 4-methyl-1,2-pentylene, 1,3-hexylene, 3,4-heptylene, 1,2-octylene, and the like, preferably in an organic solvent, such as benzene, toluene, xylene, methylene chloride, and the like and in the presence of an acid catalyst such as benzenesulfonic acid, p-toluenesulfonic acid, p-toluenesulfonic acid monohydrate and the like. The reaction is conducted at a temperature between about 20° C. and about 200° C., preferably between about 40° C. and about 150° C. The time required for the reaction is not critical and may be varied between about 1 and 48 hours, depending on the temperature, the ketalizing agent and catalyst employed.

The acylates and carbonyl derivatives of the compounds of Formula II can, if desired, be hydrolyzed by known methods, e.g., with dilute acids or bases, to the free-hydroxy and free-keto compounds, respectively.

The following preparations and examples are intended to illustrate the process of this invention as applied to representative and typical individual organisms. The following examples are for the purpose of illustrating the best mode contemplated of carrying out the invention and to supplement the foregoing disclosure of the invention with additional descriptions of the manner and process of carrying out the invention so as further to enable workers skilled in the art to do so.

PREPARATION 1

*Cycloheptanethiol*

An autoclave was charged with 60 g. of cycloheptanone, 35 g. of sulfur and 5 g. of finely divided pyrophoric iron (prepared by extracting the aluminum from a finely powdered alloy of iron and aluminum with sodium hydroxide solution as disclosed in U.S. Patent 2,402,683). The autoclave was then charged with hydrogen to a pressure of 2000 lbs./sq. in. and heated to 100° C. for ½ hr. to convert the iron to the active sulfide catalyst. The temperature was then raised at 150° C. A rapid reaction resulted and hydrogen was added from time to time to maintain the total pressure within the range of from 1000 to 2000 lbs./sq. in. When the absorption of hydrogen ceased, the autoclave was cooled and the reaction mixture was filtered to remove the catalyst. Distillation of the filtrate gave an 80% yield of cycloheptanethiol.

In the same manner, the cycloalkyl mercaptans containing from 5 to 15 carbon atoms in the cycloalkyl ring can be prepared by substituting the appropriate cycloalkanone for cycloheptanone in Preparation 1. The following are products representative:

cyclooctanethiol,
cyclononanethiol,
cyclodecanethiol,
cycloundecanethiol,
cyclododecanethiol,
cyclotridecanethiol,
cyclotetradecanethiol, and
cyclopentadecanethiol.

PREPARATION 2

*Cycloheyptylcyclohexyl sulfide*

A mixture of 22.9 g. (0.26 mole) of cycloheptene and 26 ml. (ca. 26 g., 0.26 mole) of cyclohexanethiol was irradiated with ultraviolet light until the reaction was complete, about 5½ days. The mixture was distilled through a 4″ Vigreux column, and the cycloheptylcyclohexyl sulfide (30 g.) was collected; B.P. 109–112°/0.4–0.5 torr. A center cut, B.P. 110°/0.4 torr was submitted for analysis.

*Analysis.*—Calcd. for $C_{13}H_{24}S$: C, 73.53; H, 11.39; S, 15.07. Found: C, 73.53; H, 10.81; S, 15.35.

In the same manner, other dicycloalkyl sulfides can be prepared by reacting a cycloalkene containing from 5 to 15 carbon atoms, inclusive, and a cycloalkanethiol containing from 5 to 15 carbon atoms, inclusive. The following sulfides obtained in this manner are representative:

cylopheptyl sulfide,
cyclopentyl cyclooctyl sulfide,
cyclohexyl cyclooctyl sulfide, cyclooctyl sulfide,
cyclohexyl cyclododecyl sulfide,
cyclohexyl cyclododecyl sulfide,
cyclohexyl cyclopentadecyl sulfide,
cyclononyl cyclododecyl sulfide, and
cyclopentadecyl cyclotetradecyl sulfide.

PREPARATION 3

*Cycloheptyl cyclohexyl sulfone*

To a solution of 30 g. of cycloheptyl cyclohexyl sulfide in about 300 ml. of acetic acid, 60 ml. of 30% hydrogen peroxide was added slowly with stirring. The mixture was left at room temperature overnight, poured into 1 l. of water, and the resultant precipitate was filtered and washed thoroughly with water. The crude, air-dried product (32.4 g., M.P. 78–80°) was recrystallized from 95% ethanol giving 13.3 g. of cycloheptyl cyclohexyl sulfone, M.P. 85.5–87° C.

In the same manner, other dicycloalkyl sulfones of Formula I can be prepared by substituting the appropriate dicycloalkyl sulfide for cycloheptyl cyclohexyl sulfide. For example, the dicycloalkyl sulfides, prepared and listed in the last paragraph of Preparation 2, can be converted to the following sulfones:

cycloheptyl sulfone,
cyclopentyl cyclooctyl sulfone,
cyclohexyl cyclooctyl sulfone,
cyclooctyl sulfone,
cyclohexyl cyclododecyl sulfone,
cyclohexyl cyclopentadecyl sulfone,
cyclononyl cyclodecyl sulfone, and
cyclotetradecyl cyclopentadecyl sulfone.

EXAMPLE 1

*Oxygenation of cyclohexyl sulfone*

A medium was prepared of 20 g. of cornsteep liquor (60% solids), 10 g. of commercial dextrose and 1 l. of tap water and adjusted to a pH between 4.8 and 5. One ml. of lard oil was added as an antifoam preventive. Ten l. of this sterilized medium was inoculated with a 72-hour vegetative growth of *Sporotrichum sulfurescens*, ATCC, 7159 and incubated for 48 hours at a temperature of about 28° C. with aeration at the rate of 1 l. per minute and stirring at 300 r.p.m. A solution of 2 g. of cyclohexyl sulfone in 25 ml. of dimethylformamide was then added to the fermentation. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing oxygenated cyclohexyl sulfones. The residue thus obtained was chromatographed on Florisil (synthetic magnesium silicate, hereinafter referred to as Florisil). The column was eluted with Skellysolve B (isomeric hexanes, hereinafter referred to as Skellysolve B) containing increasing proportions of acetone. The fractions eluted with 25% acetone-Skellysolve B contained a mixture of 3- and 4-hydroxycyclohexyl cyclohexyl sulfones. The fractions were combined and crystallized from acetone-Skellysolve B to give 0.9 g. of 4-hydroxycyclohexyl sulfone, M.P. about 110° C., a sample of which after two recrystallizations from acetone-hexanes melted at 109.5–111° C.

*Analysis.*—Calcd. for $C_{12}H_{23}O_3S$: C, 58.51; H, 9.00; S, 13.0. Found: C, 58.68; H, 9.06; S, 13.4.

EXAMPLE 2

*Bioconversion of cyclohexyl sulfone*

One hundred liters of a medium of the same composition as used in Example 1 was adjusted to a pH between 4.8 and 5, and to it 0.2 ml. of Dow-Corning DC–C120 antifoam agent was added as an antifoam preventive. This medium was sterilized and inoculated with a 72-hour vegetative growth of *Sporotrichum sulfurescens*, ATCC 7159, and incubated for 48 hours at a temperature of about 28° C. with aeration at the rate of 5 l. per minute and stirring at 300 r.p.m. A solution of 25 g. of cyclohexyl sulfone in 25 ml. of dimethylformamide was then added and incubation continued for an additional 72-hour period. The beer and mycelium were separated by filtration and processed as in Example 1. The residue thus obtained contained a mixture of oxygenated cyclohexyl sulfones comprised mostly of cyclohexyl sulfones oxygenated at the 3- and 4-positions.

The residue was chromatographed on silica gel packed in ethyl acetate and developed with the same solvent to give:

(A) 1.20 g. of a mixture of hydroxycyclohexyl cyclohexyl sulfones, M.P. 108–110.5° C., which after two recrystallizations from acetone-Skellysolve B gave 4-hydroxycyclohexyl cyclohexyl sulfone, M.P. 109–111° C.

*Analysis.*—Calcd. for $C_{12}H_{22}O_3S$: C, 58.51; H, 9.00; S, 13.0. Found: C, 59.22; H, 9.52; S, 12.97.

(B) 2.82 g. of a mixture of hydroxycyclohexyl cyclohexyl sulfones, M.P. 120–122.5° C., which after two recrystallizations from acetone-Skellysolve B gave 3-hydroxycyclohexyl cyclohexyl sulfone, M.P. 124–125.5° C.

*Analysis.*—Calcd. for $C_{12}H_{22}O_3S$: C, 58.51; H, 9.00; S, 13.0. Found: C, 57.41; H, 8.38; S, 13.04.

EXAMPLE 3

*3-oxocyclohexyl cyclohexyl sulfone*

The 3-hydroxycyclohexyl cyclohexyl sulfone, M.P. 124–125.5° C., from Example 3 (0.25 g.) was dissolved in acetone and oxidized with excess chromic acid (2.67 M chromic acid reagent, prepared from 2.67 g. of chromic trioxide and 23 ml. of sulfuric acid, diluted to 100 ml. with diluted water). The reaction mixture was diluted with water and the precipitate thus obtained was recovered by filtration to give, after recrystallization from acetone-Skellysolve B, 0.12 g. of 3-oxocyclohexyl cyclohexyl sulfone, M.P. 98–99° C.

*Analysis.*—Calcd. for $C_{12}H_{20}O_3S$: C, 59.00; H, 8.25; S, 13.10. Found: C, 59.01; H, 8.28; S, 13.19.

EXAMPLE 4

*4-oxocyclohexyl cyclohexyl sulfone*

The mixture of hydroxycyclohexyl cyclohexyl sulfones, M.P. 109–111° C. from Example 2 (0.25 g.) was dissolved in acetone and oxidized with chromic acid as in Example 3. The product thus obtained was recrystallized from acetone-Skellysolve B to give 0.16 g. of 4-oxocyclohexyl cyclohexyl sulfone, M.P. 113–114° C., which after recrystallization from the same solvents melted at 113.5–114° C. The infrared spectrum showed carbonyl absorption at 1740 cm.$^{-1}$.

*Analysis.*—Calcd. for $C_{12}H_{20}O_3S$: C, 59.00; H, 8.25; S, 13.10. Found: C, 59.37; H, 8.79; S, 13.29.

EXAMPLE 5

*Oxygenation of cycloheptyl cyclohexyl sulfone*

The bioconversion and extraction procedures of Example 1 were repeated using 20 l. of sterilized medium having the same composition, the microorganism, *Sporotrichum sulfurescens*, ATCC 7159, and 5.0 g. of cycloheptyl cyclohexyl sulfone as the substrate to give a residue which was shown by chromatographic analysis to contain a mixture of microbially oxygenated cycloheptyl cyclohexyl sulfones. The residue thus obtained was chromatographed on silica gel packed in ethyl acetate and eluted with the same solvent. Two products were obtained. One was 4-oxocycloheptyl cyclohexyl sulfone, which after recrystallization from acetone-Skellysolve B melted at 143–148° C.; yield, 0.86 g. The other was 4- hydroxycycloheptyl cyclohexyl sulfone, which after recrystallization from acetone-Skellysolve B melted at 78–83° C.; yield, 0.92 g.

EXAMPLE 6

*Oxygenation of cyclopentyl sulfone*

Following the procedure of Example 1, substituting cyclopentyl sulfone for cyclohexylsulfone and using the microorganism *Rhizopus arrhizus*, ATCC 11145, there is obtained a mixture of oxygenated cyclopentyl sulfones which can be separated into its various components by chromatography giving 3-hydroxycyclopentyl cyclopentyl sulfone as the major product.

EXAMPLE 7

*Oxygenation of cyclohexyl cyclopentyl sulfone*

Following the procedure of Example 1, substituting cyclohexyl cyclopentyl sulfone for cyclohexyl sulfone and using the microorganism *Deconica coprophilia*, CBS, there is obtained a mixture of oxygenated cyclohexyl cyclopentyl sulfones which can be separated into its various components by chromatography giving 3-hydroxycyclopentyl cyclohexyl sulfone, 3-hydroxycyclohexyl cyclopentyl sulfone and 4-hydroxycyclohexyl cyclopentyl sulfone as the major products.

EXAMPLE 8

*Oxygenation of cycloheptyl sulfone*

Following the procedure of Example 1, substituting cycloheptyl sulfone for cyclohexylsulfone and using the microorganism *Calonectria decora*, CBS, there is obtained a mixture of oxygenated cycloheptyl sulfones which can be separated into its various components by chromatography giving 4-hydroxycycloheptyl cycloheptyl sulfone as the major product.

EXAMPLE 9

*Oxygenation of cyclooctyl cyclopentyl sulfone*

Following the procedure of Example 1, substituting cyclopentyl cyclooctyl sulfone for cyclohexylsulfone and using the microorganism *Curvularia lunata*, ATCC 12017, there is obtained a mixture of oxygenated cyclopentyl cyclooctyl sulfones which can be separated into its various components by chromatography giving 3-hydroxycyclopentyl cyclooctyl sulfone and 5-hydroxycyclooctyl cyclopentyl sulfone as the major products.

EXAMPLE 10

*Oxygenation of cyclohexyl cyclooctyl sulfone*

Following the procedure of Example 1, substituting cyclohexyl cyclooctyl sulfone for cyclohexylsulfone and using the microorganism *Aspergillus niger*, ATCC 8740, there is obtained a mixture of oxygenated cyclohexyl cyclooctyl sulfones which can be separated into its various components by chromatography giving 3-hydroxycyclohexyl cyclooctyl sulfone, 4-hydroxycyclohexyl cyclooctyl sulfone and 5-hydroxycyclooctyl cyclohexyl sulfone as the major products.

EXAMPLE 11

*Oxygenation of cyclododecyl cyclohexyl sulfone*

Following the procedure of Example 1, substituting cyclododecyl cyclohexyl sulfone for cyclohexyl sulfone and using the microorganism *Cunninghamella blakesleeana*, ATCC 8688a, there is obtained a mixture of oxygenated cyclododecyl cyclohexyl sulfones which can be separated into its various components by chromatography giving 3-hydroxycyclohexyl cyclododecyl sulfone, 4-hydroxycyclohexyl cyclododecyl sulfone and 6-hydroxycyclododecyl cyclohexyl sulfone as the major products.

EXAMPLE 12

*Oxygenation of cyclohexyl cyclopentadecyl sulfone*

Following the procedure of Example 1, substituting cyclohexyl cyclopentadecyl sulfone for cyclohexylsulfone and using the microorganism *Gibberella saubinettii*, CBS, there is obtained a mixture of oxygenated cyclohexyl cyclopentadecyl sulfones which can be separated into its various components by chromatography giving 3-hydroxycyclohexyl cyclopentadecyl sulfone and 4-hydroxycyclohexyl cyclopentadecyl sulfone as the major products.

EXAMPLE 13

*Oxygenation of cyclodecyl cyclononyl sulfone*

Following the procedure of Example 1, substituting cyclodecyl cyclononyl sulfone for cyclohexylsulfone and using the microorganism *Cyathus poppigii*, CBS, there is obtained a mixture of oxygenated cyclopentyl sulfones which can be separated into its oxygenated components by chromatography giving 6-hydroxycyclodecyl cyclononyl sulfone as the major product.

EXAMPLE 14

*Oxygenation of cyclopentadecyl cyclotetradecyl sulfone*

Following the procedure of Example 1, substituting cyclopentadecyl cyclotetradecyl sulfone for cyclohexylsulfone and using the microorganism *Ascochyta linicola*, NRRL 2923, there is obtained a mixture of oxygenated cyclopentadecyl cyclotetradecyl sulfones which can be separated into its various components by chromatography giving 7-hydroxycyclotetradecyl cyclopentadecyl sulfone as the major product.

EXAMPLE 15

*Oxygenation of cyclopentylsulfone*

A medium is prepared of 1.5 g. of beef extract, 1.5 g. of yeast extract, 5 g. of peptone, 1.0 g. of dextrose, 3.5 g. of sodium chloride, 3.58 g. of dipotassium phosphate and 1.32 g. of monopotassium phosphate, 1 liter with tap water and adjusted to about pH 7. One ml. of lard oil is added as a foam preventive. Ten liters of this sterilized medium is inoculated with a 72-hour vegetative growth of *Mycobacterium rhodochrous*, ATCC 4276 and incubated for 48 hours at a temperature of about 28° C. with aeration at the rate of 0.5 l. per minute and stirring at 300 r.p.m. After about 48 hours of agitation, a solution of 2.5 g. of cyclopentylsulfone in 25 ml. of dimethylformamide is added and incubation is continued for additional 72-hour period. The beer and mycelium are separated by filtration and extracted in the same manner as described in Example 1 to give a mixture of oxygenated cyclopentyl sulfones, which can be separated into its various components by chromatography giving 3-hydroxycyclopentyl cyclopentyl sulfone as the major product.

In Examples 1, 2 and 5 to 15, inclusive, above, other species of Subphylum 2 of Phylum III, for example, those species listed in Table II, above, can be used in each of the said examples with similar results. The procedure of Example 15 is preferred for species of the class Schizomycetes. The following are representative:

*Absidia cylindrospora*, NRRL 2796
*Circinella spinosa*, ATCC 9025
*Gongronella lacrispora*, NRRL 2643
*Gloniopsis brerisaccata*, CBS
*Glonium clavisporum*, CBS
*Hysterium angustatum*, CBS
*Mytilidion tortile*, CBS
*Hypomyces haematococcus*, CBS
*Dermea libocedri*, CBS
*Cenangium abietis*, CBS
*Adelopus nudus*, CBS
*Chaetomium globosum*, ATCC 6205
*Endothia parasiticus*, ATCC 9414
*Guignardi bidwelli*, ATCC 9559

Boletus luteus, CBS
Alnicola escharoides, CBS
Corticium microsclerotia, NRRL 2727
Diplodia natalensis, ATCC 9055
Wojnowicia graminis, CBS
Septomyxa affinis, ATCC 6737
Aspergillus versicolor, ATCC 9577
Keratinomyces ajelloi, CBS
Penicillium patulum, ATCC 9260
Trichothecum roseum, NRRL 1665
Brachysporium oryzae, ATCC 11571
Cladosporium resinae, NRRL 2778
Cylindrocarpon didymum, CBS
Rhizoctonia solani, ATCC 6221
Pseudomonas fluorescens, ATCC 949
Micrococcus cerolyticus, ATCC 12559
Nocardia erythropolis, ATCC 4277
Streptomyces roseochromogenus, ATCC 7159

EXAMPLE 16

*4-oxocyclohexyl cyclohexyl sulfone cyclic ethylene ketal*

A solution of 1.0 g. of 4-oxocyclohexyl cyclohexyl sulfone in 3.0 ml. of redistilled ethylene glycol and about 30 ml. of redistilled toluene in a reflux apparatus equipped with a water trap is heated nearly to boiling and 15 mg. of p-toluenesulfonic acid monohydrate is added. The mixture is refluxed for about 2 hours. An additional 1.5 ml. of ethylene glycol is then added and boiling is continued until the reaction is essentially complete (a total of about 5 hours boiling is usually sufficient). The reaction mixture is cooled, washed with saturated sodium bicarbonate solution and twice with water. The organic phase is dried over anhydrous sodium sulfate and evaporated to give 4-oxocyclohexyl cyclohexyl sulfone cyclic ethylene ketal, which can be purified by recrystallization from acetone-Skellysolve B.

In the same manner, the other compounds of Formula II, wherein X is keto, can be converted to cyclic ethylene ketals or to other cyclic alkylene ketals by reacting them with the appropriate alkanediol.

EXAMPLE 17

*4-oxycycloheptyl cyclohexyl sulfone*

Following the procedure of Example 3, 4-hydroxycycloheptyl cyclohexyl sulfone was oxidized to 4-oxocycloheptyl cyclohexyl sulfone; the product was identical with that obtained in Example 5.

In the same manner, other hydroxycycloalkyl cycloalkyl sulfones of Formula II can be oxidized to oxocycloalkyl cycloalkyl sulfones. The following products are illustrative:

3-oxocyclopentyl cyclopentyl sulfone,
3-oxocyclopentyl cyclohexyl sulfone,
3-oxocyclohexyl cyclopentyl sulfone,
4-oxocyclohexyl cyclopentyl sulfone,
4-oxocycloheptyl cycloheptyl sulfone,
3-oxocyclopentyl cyclooctyl sulfone,
5-oxocyclooctyl cyclopentyl sulfone,
3-oxocyclohexyl cyclooctyl sulfone,
4-oxocyclohexyl cyclooctyl sulfone,
5-oxocycloctyl cyclohexyl sulfone,
3-oxocyclohexyl cyclododecyl sulfone,
4-oxocyclohexyl cyclododecyl sulfone,
6-oxocyclododecyl cyclohexyl sulfone,
3-oxocyclohexyl cyclopentadecyl sulfone,
4-oxocyclohexyl cyclopentadecyl sulfone,
6-oxocyclodecyl cyclononyl sulfone, and
7-oxocyclotetradecyl cyclopentadecyl sulfone.

EXAMPLE 18

*4-acetoxycyclohexyl cyclohexyl sulfone*

A solution of 1.0 g. of 4-hydroxycyclohexyl cyclohexyl sulfone in dry pyridine is treated with 3 ml. of acetic anhydride and allowed to stand until the reaction is complete (about 24 hours). The mixture is then poured into about 100 ml. of water with stirring. The precipitated solid is collected on a filter and dried to give 4-acetoxycyclohexyl cyclohexyl sulfone, a light-colored crystalline solid which can be further purified by recrystallization from acetone-Skellysolve B.

In the same manner, other hydroxycycloalkyl cycloalkyl sulfones of Formula II, e.g., those prepared in Examples 2 and 5 to 14, above, can be acetylated. The following products are representative:

3-acetoxycyclohexyl cyclohexyl sulfone,
4-acetoxycycloheptyl cyclohexyl sulfone,
3-acetoxycyclopentyl cyclopentyl sulfone,
3-acetoxycyclopentyl cyclohexyl sulfone,
3-acetoxycyclohexyl cyclopentyl sulfone,
4-acetoxycyclohexyl cyclopentyl sulfone,
4-acetoxycycloheptyl cycloheptyl sulfone,
3-acetoxycyclopentyl cyclooctyl sulfone,
5-acetoxycyclooctyl cyclopentyl sulfone,
3-acetoxycyclohexyl cyclooctyl sulfone,
4-acetoxycyclohexyl cyclooctyl sulfone,
5-acetoxycyclooctyl cyclohexyl sulfone,
3-acetoxycyclohexyl cyclododecyl sulfone,
4-acetoxycyclohexyl cyclododecyl sulfone,
6-acetoxycyclododecyl cyclohexyl sulfone,
3-acetoxycyclohexyl cyclopentadecyl sulfone,
4-acetoxycyclohexyl cyclopentadecyl sulfone,
6-acetoxycyclodecyl cyclononyl sulfone, and
7-acetoxycyclotetradecyl cyclopentadecyl sulfone.

The free hydroxy compounds of Formula II, for example, those prepared in Examples 2 and 5 to 14 above, are converted to acylates by reaction with the appropriate acid anhydride in the manner disclosed in Example 18 above, by reaction with the appropriate acid chloride or bromide, by reaction with the appropriate ester or by reaction with the appropriate acid in the presence of an esterification catalyst. The acylates thus produced include those wherein the acyl radical is that of an acid previously listed.

We claim:

1. A compound of the formula:

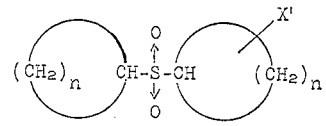

wherein $n$ is a whole number from 4 to 14, inclusive; and $X'$ is selected from the group consisting of hydroxy, keto and acyloxy in which the acyl radical is that of a hydrocarbon carboxylic acid containing from 1 to 12 carbon atoms, inclusive.

2. A compound of the formula:

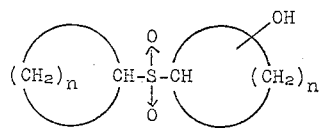

wherein $n$ is a whole number from 4 to 14, inclusive.

3. 4-hydroxycyclohexyl cyclohexyl sulfone.
4. 3-hydroxycyclohexyl cyclohexyl sulfone.
5. 4-hydroxycycloheptyl cyclohexyl sulfone.
6. A compound of the formula:

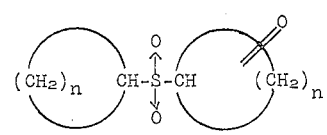

wherein $n$ is a whole number from 4 to 14, inclusive.

7. 3-oxocyclohexyl cyclohexyl sulfone.
8. 4-oxocyclohexyl cyclohexyl sulfone.

9. 4-oxocycloheptyl cyclohexyl sulfone.
10. A compound of the formula:

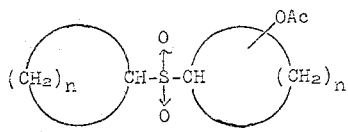

wherein $n$ is a whole number from 4 to 14, inclusive and Ac is the acyl radical of a hydrocarbon carboxylic acid containing from 1 to 12 carbon atoms, inclusive.
11. 3-acetoxycyclohexyl cyclohexyl sulfone.
12. 4-acetoxycyclohexyl cyclohexyl sulfone.
13. 4-acetoxycycloheptyl cyclohexyl sulfone.

References Cited by the Examiner
UNITED STATES PATENTS

| | | | |
|---|---|---|---|
| 2,127,400 | 8/1938 | Gibbs | 260—607 |
| 2,257,969 | 10/1941 | Loane et al. | 260—607 |
| 2,314,379 | 3/1943 | Zerweck et al. | 260—607 |

LORRAINE A. WEINBERGER, *Primary Examiner.*

V. GARNER, *Assistant Examiner.*